Nov. 30, 1965  R. S. BRIGHAM  3,220,320
APPARATUS FOR MANUFACTURING SPIRALLY WOUND CONTAINERS
Filed July 24, 1962  3 Sheets-Sheet 2

INVENTOR.
ROGER S. BRIGHAM
BY *Walter H. Beland*
AGENT

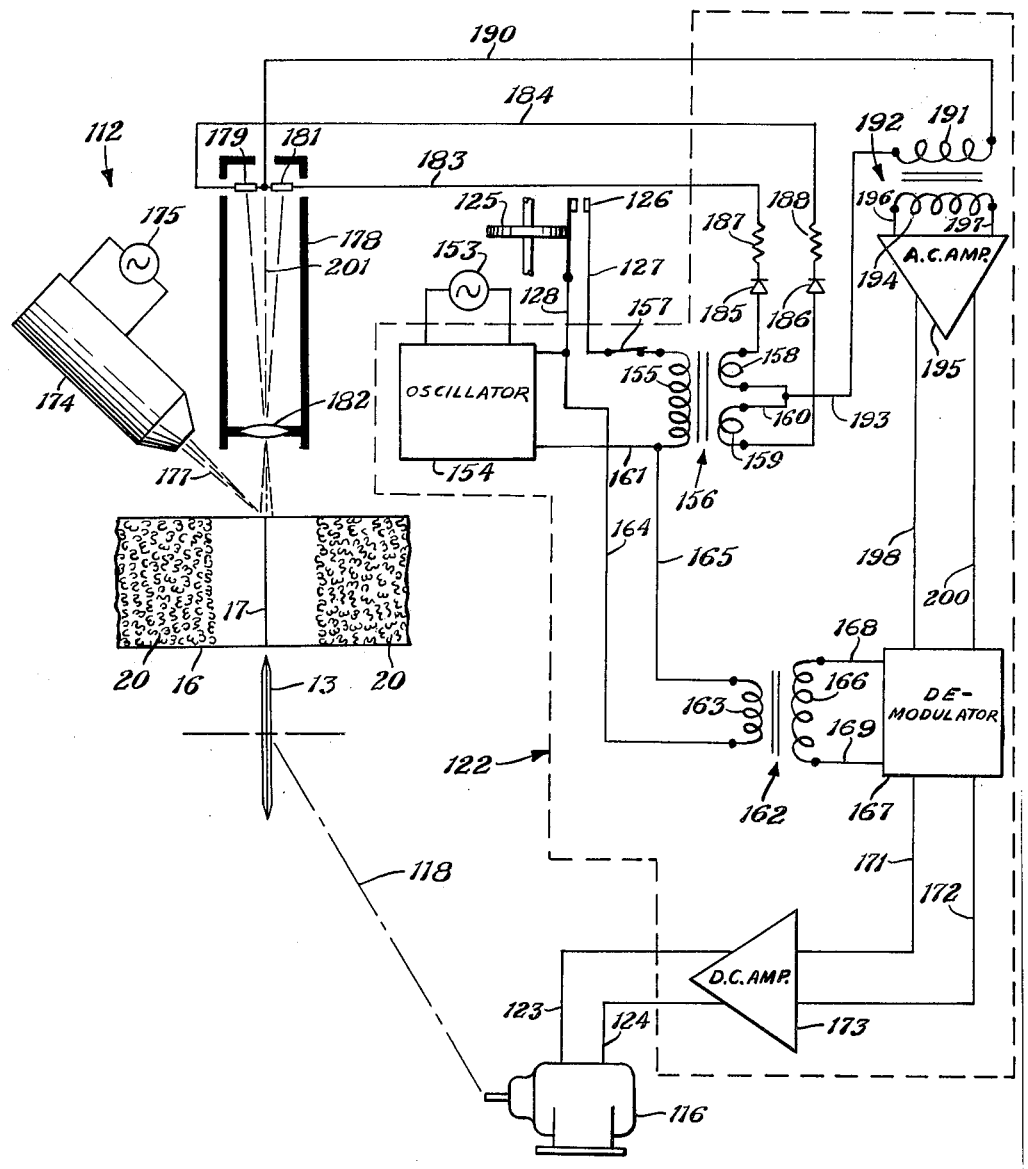

… … …

United States Patent Office 3,220,320
Patented Nov. 30, 1965

3,220,320
APPARATUS FOR MANUFACTURING SPIRALLY WOUND CONTAINERS
Roger S. Brigham, Crete, Ill., assignor to Continental Can Company, Inc., New York, N.Y., a corporation of New York
Filed July 24, 1962, Ser. No. 212,018
8 Claims. (Cl. 93—80)

My invention relates to the art of manufacturing round tubular containers for such products as food, automobile engine oil, household cleansers and the like. More specifically my invention relates to the manufacture of such containers from multiple plies of strip material that are spirally wound on a mandrel and adhesively bonded together to produce a tube which is cut up into individual container lengths; which usually, but not necessarily, will have metal covers double-seamed on to the ends thereof in the same manner that the covers are double-seamed on to the ends of tin cans.

This method of making containers and machinery for making the containers are well-known, having been used commercially for at least thirty years. Up until recent years, it was the practice that the strip forming the outer layer of the spirally wound containers was a plain strip not decorated in any manner or having any printed information thereon. After the filling and closing of such containers a rectangular paper label was wrapped around each container and adhesively applied thereto as is the usual practice today of applying such labels to tin cans.

In recent years, a new technique of manufacturing such containers has been resorted to in which the strip forming the outer layer of the containers has repetitive label patterns printed thereon such that each container cut from the wound tube will already be labeled.

In using this new technique, it is necessary that the being wound tube be accurately cut with respect to the positions of the individual labels thereon so that the labels will be properly centered on the individual containers. If the being wound tube is not cut within the allowable tolerance for label misalignment the result will be that at least one container will be destroyed if a single cutter is being used to cut off a long piece of tube from which individual containers will subsequently be cut by a gang cutter, or, perhaps a half-dozen containers may be destroyed if a gang type cutter is being employed to simultaneously cut the being wound tube into container lengths.

The specific purpose of the present invention is to provide improvements in machinery for manufacturing spirally wound containers by this new technique which results in the being wound tube being cut in the desired places thereon with greater accuracy than heretofore has been achieved. This results in the labels being more accurately positioned on the containers and also a saving of material, which, although slight for each individual container, amounts to a considerable saving when millions, and even billions, of containers are being manufactured yearly.

The invention will best be understood by referring to the following description and drawings in which:

FIG. 3 is a schematic showing of the electrical control system for accurately positioning the cutter, or cutters, relative to the being wound tube;

Figure 1:
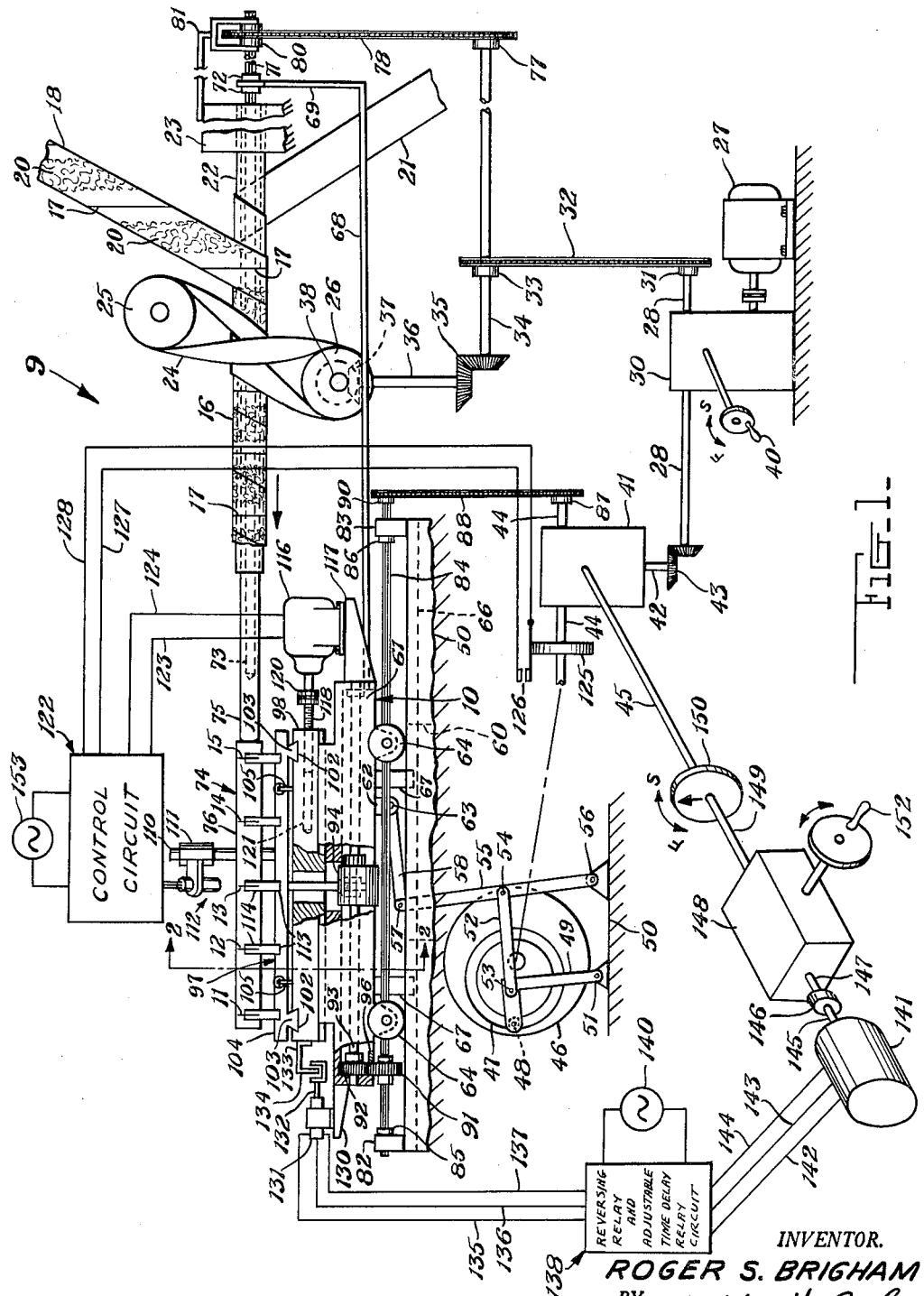
FIG. 1 is a somewhat schematic representation of a well-known type of spiral winding machine shown in side elevation with certain of the parts being in section and having incorporated therein the features of the present invention.
Figure 2:
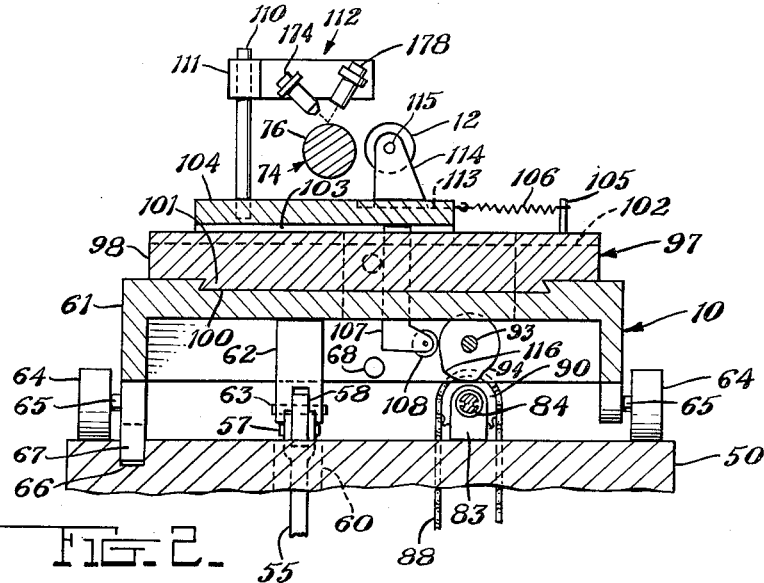
FIG. 2 is a transverse elevational section view taken along line 2—2 of FIG. 1 showing details of the carriage and cutting mechanism.
Figure 4:
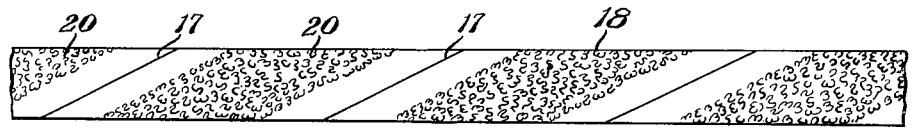
FIG. 4 is a view, showing in the flat, a length of strip material having repeat patterns printed thereon, which, when spirally wound, forms the outer layer of the containers.

Referring to FIGS. 1 and 2 of the drawings in particular, it will be seen that the spiral winding machine generally indicated at 9 is provided with a main carriage indicated generally at 10 for carrying a plurality of cutters 11, 12, 13, 14 and 15, which are used to sever the being wound tube 16 along equally spaced circumferential lines 17 that are pre-applied on the outer cover forming strip 18. Also pre-applied on strip 18 between the lines 17 are repetitive labels or decorative patterns 20. In accordance with usual practice a strip 21 forming the inner tube wall is spirally wound on a fixed mandrel 22 with the edges of the convolutions of the spiral formed being in abutting relationship. The cover forming strip 18 is wound on top of the strip 21 with the edges of this strip being out of register with the edges of strip 21 and in slightly overlapped relationship. The under-surface of the strip 18 is provided with an adhesive that holds the resultant wound tube 16 together. The right end of the mandrel 22 is suitably mounted in a stationary frame member of the machine indicated at 23. A crossed belt 24 entrained around pulleys 25 and 26 turns the being wound tube 16 on the mandrel 22 and advances it forwardly along the mandrel to the left. The belt 24 is driven by motor 27 through a power train comprising the output shaft 28 of a P.I.V. (positive infinitely variable) drive unit 30, sprocket 31, chain 32, sprocket 33, shaft 34, miter gears 35, shaft 36 and miter gears 37 which drive the shaft 38 on which the pulley 26 is mounted. The speed of the P.I.V. output shaft 28, and hence the speed of the belt 24, may be adjusted as desired by moving the speed adjustment handle 40 of the P.I.V. unit 30 in the desired direction.

A second P.I.V. unit 41 has an input shaft 42 which is driven by a set of miter gears 43 by the output shaft 28 of the P.I.V. drive 30. P.I.V. drive 41 has an output shaft 44 the speed of which may be adjusted by rotating the P.I.V. adjusting shaft 45 to a new adjusted position as desired. Mounted on the output shaft 44 for rotation therewith is a cam 46. Cam 46 has a cam track 47 in which rides a cam follower 48. Cam follower 48 is mounted on one leg of an L-shaped member 49. The lower extremity of the other leg of member 49 is pivotally connected to a fixed frame member 50 at 51. A connecting bar 52 is pivoted at one end thereof to the member 49 at 53; the other end thereof being pivoted at 54 to a generally vertically disposed lever arm 55. The lower end of the lever arm 55 is pivotally connected to the stationary frame 50 at 56, while the upper end is pivotally connected at 57 to a generally horizontal connecting bar 58. A slot 60 is provided in the frame 50 for movement of the lever arm 55 therein. The main carriage 10 is provided with a frame 61 which has depending therefrom an extension 62 to which the other end of connecting bar 58 is pivotally connected by means of a pin 63.

Pivot points 51, 53, 54 and 56 form the corners of a parallelogram linkage through which back and forth motion is provided to the carriage 10 parallel to the mandrel 22 and being wound tube 16. The carriage 10 rolls back and forth on four rollers 64 carried on stub shafts 65 which are mounted in the frame 61. In order to guide the carriage 10 a slot 66 is provided in the frame 50. A pair of tongues 67 depending from the carriage frame 61 slidingly fit into the slot 66.

The cam track 47 is cut so that the carriage will move at a constant speed while it is moving to the left in the direction that the wound tube 16 is moving. It is to be understood, of course, that there will be an acceleration of the carriage at the beginning of its movement from right to left until the desired constant speed has been attained and then there will be a deceleration of the carriage near the end of its movement to the left prior to the return stroke of the carriage to the right. With this arrangement, the speed of the being wound tube 16 to the left and the speed of the carriage 10 during its leftward stroke can be adjusted to be substantially equal by varying the speed of P.I.V. output shaft 44.

Attached at one end to the carriage frame 61 is a long arm 68 having its opposite end bent at right angles thereto as at 69. The end 69 is bored to loosely fit around a splined shaft 71. A pair of collars 72 mounted on the shaft 71 maintain the end 69 of the arm 68 in fixed longitudinal position on the shaft 71. Shaft 71 passes through the mandrel 22 and the left end thereof is provided with threads and is threaded into a threaded bore 73 which is provided in the right end portion of a movable mandrel generally indicated at 74. The right end portion of the mandrel 74 indicated at 75 is smaller in diameter than the left end portion of the mandrel 74 which is indicated at 76. The smaller diameter of the end 75 allows it to be slidably fitted into the mandrel 22 which is tubular. Due to the connection of the arm 68 to the carriage 10 and to the shaft 71 the mandrel 74 is caused to move longitudinally back and forth with the carriage 10.

The left end portion 76 of the mandrel 74 forms a back up anvil for the cutters 11, 12, 13, 14 and 15. The mandrel 74 is also caused to rotate in timed relation with the winding belt 24 by means of a sprocket 77 mounted on the shaft 34, a chain 78 and a sprocket 80, mounted on the splined shaft 71. A suitable retainer 81 mounted on the frame 23 retains the sprocket 80 against longitudinal movement with the shaft 71 as the shaft reciprocates with the carriage 10.

Journaled in bearing blocks 82 and 83 mounted on the frame 50 is a splined shaft 84. Shaft 84 is prevented from shifting longitudinally in the bearing blocks 82 and 83 by means of collars 85 and 86. Shaft 84 is caused to rotate by means of sprocket 87 mounted on the output shaft 44 of the P.I.V. drive unit 41, chain 88, and a sprocket 90, which is mounted on the right end of shaft 84. A gear 91 is slidably mounted on the shaft 84 and engaged with the splines thereof so as to rotate with the shaft 84. Gear 91 meshes with, in driving relationship, a gear 92. Gear 92 is fixedly mounted on a shaft 93 which is rotatably journaled in the carriage frame 61. Intermediate the ends of the shaft 93 is fixedly mounted thereon a cam 94. A cross piece 96 mounted on the frame 61 retains the gear 91 in meshing relationship with the gear 92.

Mounted on top of the main carriage 10 is a sub-carriage generally indicated at 97. The sub-carriage has a main body portion 98. The frame 61 is suitably channeled on the upper surface thereof as indicated at 100 for receiving in slidable engagement a fitting projection on the under surface of the main body 98 of the sub-carriage 97 which is indicated at 101. The upper surface of the main body 98 is suitably channeled out in two spaced apart locations indicated at 102 for slidably receiving matching projections 103 which are provided on the under surface of a transversely slidable frame member 104 of the sub-carriage 97. A pair of vertical posts 105 are mounted on the upper surface of the main body 98 for the attachment of one end of a pair of springs 106. The other end of the springs 106 is suitably attached to the slidable frame 104. As viewed in FIG. 2 the springs 106 urge the slidable frame 104 to the right. A depending arm 107 is fixed to the under surface of the frame 104; the lower end of the arm being bifurcated for the reception of a cam roller 108. A vertical standard 110 having an adjustable bracket 111 mounted thereon is mounted in the upper surface of the frame 104. The bracket 111 carries a photo-electric eye observing unit generally indicated at 112.

A plurality of channels 113 are provided in the upper surface of the frame 104 for receiving a plurality of brackets 114. The cutters 11, 12, 13, 14 and 15 are rotatably mounted on pins 115 in the bifurcated upper end of the brackets 114. The channels 113 act as guides during positioning the brackets 114 to obtain the proper distance between the cutters and the large end 76 of the mandrel 74. Once the brackets 114 have been properly positioned they are firmly held in place by any suitable means which are not shown.

The cam 94 is caused to make one revolution for each revolution of the cam 46. With this timing arrangement it will be apparent that the cam 94 will make one complete revolution for each complete back and forth cycle of the carriage 10.

The high point 116 of the cam 94 is so positioned that it will engage the cam roller 108 somewhere during the middle part of the right to left traverse of the carriage 10 as viewed in FIG. 1 to cause the slidable frame 104 to be shifted to the left as viewed in FIG. 2 to bring the cutters 11, 12, 13, 14 and 15 into engagement with the being wound tube 16 to sever the tube into four container lengths.

A reversible electric motor 116 is mounted on a bracket 117 which in turn is mounted on the frame 61. The output shaft of motor 116 is coupled to a threaded shaft 118 by means of a flexible coupling 120. Threaded shaft 118 is received in a threaded bore 121, in the main body 98 of the sub-carriage 97. Thus, as the reversible electric motor 116 rotates in one direction, the sub-carriage 97 will be caused to move to the right with respect to the main carriage 10 as viewed in FIG. 1, and to the left when the motor 116 is caused to turn in the opposite direction. Motor 116 is connected into a control circuit generally indicated at 122 by wires 123 and 124.

A cam 125 is mounted on the output shaft 44 of the P.I.V. drive unit 41. Cam 125 operates a set of contacts 126 to close the contacts 126 for a definite interval during each rotation of the cam 125. In operation, the contacts 126 will be held closed only during that portion of the cycle of movement of the carriage 10 in which the photo-electric eye observing unit 112 is tracking a circumferential line 17 on the being wound tube 16. Wires 127 and 128 connect the contacts 126 into the control circuit 122.

Mounted on a bracket 130 which is attached to the left end of the frame 61 of carriage 10 is a single pole double throw switch 131. The switch 131 has an operating plunger 132 the outer end of which is in the shape of a U. A bracket 133 is mounted on the left end of the main body 98 of the sub-carriage 97. Bracket 133 has a depending finger portion 134 which freely fits into the open end of the U shaped end of the plunger 132. Wires 135, 136 and 137 connect switch 131 into a reversing relay and adjustable time delay relay circuit of standard design generally indicated at 138. Power is supplied to the circuit 138 by means of a suitable A.C. power source such as the generator 140.

A reversible motor 141 is connected by wires 142, 143 and 144 into the circuit 138. The output shaft 145 of motor 141 is coupled by means of a flexible coupling 146 to the input shaft 147 of a differential gear box 148 which is of standard design. Differential gear box 148 has an output shaft 149 which is coupled at 150 to the speed adjusting shaft 45 of the P.I.V. drive unit 41. In operation, as shaft 147 is caused to rotate by the motor 141 the shaft 149 will be caused to rotate a proportional amount. The gear box 148 also has a manual adjustment 152 by which the shaft 149 may be caused to be rotated in either direction any desired amount with respect to the input shaft 147. This allows the machine operator to manually adjust the speed of the output shaft 44 of the P.I.V. drive unit 41 to obtain the desired traverse speed of the carriage 10.

The control circuit 122 is energized by a suitable A.C. power source such as generator 153. As will be seen in FIG. 3, the generator 153 supplies power to an oscillator which develops a suitable A.C. excitation such as for instance 1000 c.p.s. Wire 128 connects the oscillator which is indicated at 154 with one of the contacts of the set of contacts 126. The other contact is connected by means of wire 127 via switch 157 to one lead of the primary winding 155 of a transformer 156. Wire 161 connects the oscillator to the other lead of the primary winding 155. Transformer 156 has two secondary windings indicated at 158 and 159 which are connected together by means of a wire 160.

A transformer generally 162 has one winding thereof 163 connected to wires 128 and 161 by wires 164 and 165. The other winding 166 of transformer 162 is connected into a de-modulator 167 by wires 168 and 169. Wires 171 and 172 connect the de-modulator 167 with a D.C. amplifier 173. Wires 123 and 124 from reversible motor 116 also connect into the D.C. amplifier 173.

The photo-electric observing unit 112 has a light emitting unit 174 that is suitably energized such as by the generator 175. Light rays therefrom indicated at 177 are directed on to the being wound tube 16 so as to illuminate a small portion of a circumferential line 17. Photo-electric observing unit 112 also includes a substantially light impervious housing 178 which houses a pair of photo-cells 179 and 181. A lens 182 is used to focus the image of the illuminated portion of the tube 16 on to the photo-cells 179 and 181. A wire 183 connects photo-cell 181 to the winding 158 of transformer 156. A wire 184 connects photo-cell 179 to the winding 159 of transformer 156. Rectifying diodes 185 and 186 are provided in wires 183 and 184 respectively. Current limiting resistors 187 and 188 are also provided in wires 183 and 184 respectively. A wire 190 connects photo-cells 179 and 181 to a winding 191 of a transformer generally 192. A wire 193 connects wire 160 to the other end of winding 191. The other winding 194 of transformer 192 connects into an A.C. amplifier 195 via wires 196 and 197. A.C. amplifier 195 is connected to the de-modulator 167 by means of wires 198 and 200.

It is to be understood that the observing unit 112, the relay circuit 138 and control circuit 122 are fabricated entirely from conventional components in a known manner and no specific claim is made herein to any of the circuitry illustrated.

The cutter 13 of the array of cutters comprising cutters 11, 12, 13, 14 and 15 is fixedly centered with respect to the optical axis of the lens 182 which is indicated at 201. Optical axis 201 is, in turn, centered with respect to the photo-cells 179 and 181.

Figure 5:
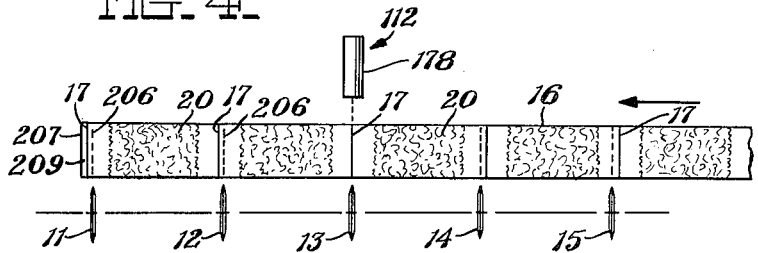
FIG. 5 is a view of a length of wound tube having a plurality of repeat patterns thereon in position for being cut up into individual containers by a gang type cutter.

The arrangement of the entire array of cutters when in position to be brought into engagement with the being wound tube 16 to sever the tube into a plurality of container lengths is shown in FIG. 5. In such a gang cutting operation as shown in FIG. 5 it is desirable, although not absolutely necessary, that the center cutter 13 of the array of cutters, be the cutter that is brought into very accurate registration with respect to its adjacent circumferential line 17 by means of the observing unit 112 acting through the control circuit 122.

Figure 6:
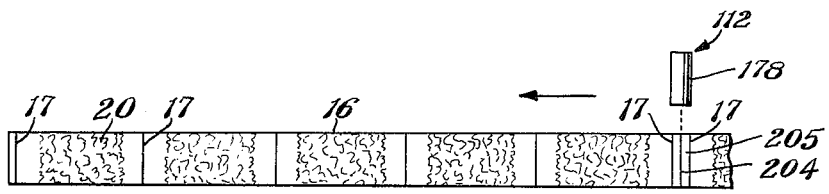
FIG. 6 shows a length of spirally wound tube having a plurality of repeat patterns thereon in proper position to be cut by a single cutter for subsequent cutting up into individual container lengths.

In FIG. 6 is shown an arrangement where a single cutter 203 is employed in the machine 9 in which case a special registration ring 204 is provided that is centered in a trim space 205 which is provided at periodic intervals between container length indicating circumferential lines 17. In this arrangement the length of tube to be cut off, shown to the left of the cutter 203, which will result from the commitment of the cutter 203 against the being wound tube 16 is subsequently cut up into individual container lengths in a separate machine having gang cutters.

In order to better set forth the nature of the present invention it is at this time pointed out that the use of a photo-electric observing unit analogous to the observing unit 112 for detecting a registration control feature on the being wound tube, or, on the strip material before it is wound, is now well known in the art and reference is made herein to U.S. Patent No. 2,623,443 issued to Ernest B. Robinson on December 30, 1952. This patent discloses apparatus for photo-electrically detecting anticipated discontinuities as they pass by a fixedly positioned detecting device and which signals the need for an adjustment whenever a discontinuity, such as a circumferential ring around the being wound tube, gets out of time with its anticipated instant of arrival at the detecting unit. By this means the main carriage, similar to carriage 10, together with the tube cutting knives, is caused to be periodically re-positioned with respect to the being wound tube by a manually selectable amount.

In accordance with the presently disclosed apparatus, on the other hand, the photo-electric observing unit 112 is mounted on the carriage 10 for back and forth movement therewith. This permits the observing unit to actually track a circumferential line 17 provided at the end of each container length or the special registration ring 204 of FIG. 6. During the tracking of a circumferential line, such as a line 17, the photo-electric observing unit 112 cooperating with the control circuit 122 and the reversible motor 116 will constantly operate to bring the cutter 13 into precise alignment with the line 17 during the constant velocity portion of the stroke of the carriage 10 in the direction of advance of the tube 16 until the cutters are brought into action to cut the tube. The use of this arrangement results in a greater accuracy of cutting than has ever heretofore been achieved to the best of my knowledge in the field of manufacturing spirally wound containers.

In the operation of the apparatus of FIG. 1 the strips 20 and 21 are fed into the crossed belt 24 by the operator of the machine and when properly started the belt 24 is brought up to speed by means of the adjusting handle 40 of the P.I.V. drive unit 30. The tube 16 being produced will begin moving to the left at the desired speed as adjusted. The carriage 10 will start traversing, and, the machine operator, by means of the adjusting handle 152 on the differential gear box 148 will adjust the position of the shaft 45 of P.I.V. drive unit 41 to synchronize the speed of the carriage 10 to that of the being wound tube 16 and position the cutter 13 in close registration with a circumferential line 17, during each right to left movement of the carriage 10. Once this adjustment has been made the operator will then close switch 157, as shown in FIG. 3, to energize the control system.

The machine will now be automatically controlled as will be best described by making reference to FIG. 3 in particular. As illustrated, the cutter 13 is in substantial alignment with a line 17, meaning that line 17 is nearly centered with respect to the optical axis 201 of the lens 182 since the cutter 13 is fixedly centered on the optical axis. The line 17 may be a narrow line in the order of .015 of an inch in width and may be a dark line on a light background or a light line on a dark background, as desired, or as necessary, depending upon the background color of the being wound tube 16. The illuminated area of the tube 16 containing the line 17 will be projected as an image by the lens 182 on to the photo-cells 179 and 181.

If, for example, the cutter 13 is perfectly aligned with a line 17, the image of the line 17 will be perfectly centered between the photo-cells, the photo-cells will be equally illuminated and their electrical resistances will be equal. Uni-directional pulse voltages are applied to the photo-cell 181 from the winding 158 of the transformer 156 through the rectifying diode 185 and current limiting resistance 187 via wire 183. At the same time uni-directional pulse voltages are applied to the photo-cell 179 from the winding 159 through rectifying diode 186 and current limiting resistance 188 via wire 184. These applied pulses are always equal in magnitude, of the same polarity, and are alternate in time. Since photo-cells 179 and 181 are now in a condition of equal resistance, pulses of equal magnitude are impressed on wire 190 through photo-cells 179 and 181. The pulses are impressed on the winding 191 of transformer 192, then are transformed and impressed on the winding 194 and delivered to A.C. amplifier 195 via the wires 196 and 197. The de-modulator 167 receives these signal pulses through wires 198 and 200. Demodulator 167 is energized at the same frequency as the oscillator 154 and transformer 156 through the transformer 162. Since the pulses being impressed on the de-modulator 167 are still equal in magnitude and of the same polarity; upon being de-modulated; there will be no net D.C. component for transmission through wires 171 and 172 to the D.C. amplifier 173 to energize the reversible motor 116. The cutter 13 will thus remain aligned with the adjacent line 17.

As the centering of line 17 is initially seen by the observing unit 112, or as its tracking thereby continues, the line 17 may be, or tend to drift, either to the left or right of the optical axis 201. This may occur as a result of initial misalignment at the instant of energizing the control circuit by cam 125 through contacts 126 or it may be due to the rate of movement of the tube and the cutter carriage 10 being slightly out of synchonization, or due to slight variances in the accuracy of the winding of the tube which may be brought about by slight changes in the caliper of the webs or strips 20 and 21, in the stretching of the strips, or by transient relative motions due to inertial surges arising in the machine or the strip feed system. Any such shifting of the line 17 will result in one or the other of the photo-cells 179 and 181 receiving a greater portion of the projected image of the line 17 thereon. This results in a decrease of the resistance of one of the photo-cells and a corresponding increase in the resistance of the other. In this situation the pulse pattern impressed on wire 190 will not be equal as before but will now consist of alternate large and small pulses. Once such pulses are impressed on the de-modulator 167 via the transformer 192 and amplifier 195 the result upon de-modulation is that there will be a net D.C. component. This resulting net D.C. component when impressed on the D.C. amplifier 173 through wires 171 and 172 will result in the operation of the motor 116 by the amplified D.C. component being transmitted to the motor 116 through wires 123 and 124.

At this time, it is pointed out that the reversible motor 116 is sensitive to the polarity of the direct current supplied to it through wires 123 and 124 so as to rotate in one direction for one polarity of the direct current and in the opposite direction for the other polarity of the direct current.

The resulting operation of the motor 116 causes the shaft 118 to rotate resulting in the shifting of the sub-carriage 97 with respect to the main carriage 10 and consequent movement of the cutter array and observing unit 112 in a direction to eliminate the variance in alignment between the line 17 and the optical axis 201 of the lens 182. As the correction process progresses the signal pulses in wire 190 will become closer and closer to being even in amplitude which results in less and less current being supplied to the motor 116 until, when substantially perfect alignment is achieved, the motor 116 will stop.

If the situation exists in which the line 17 is misaligned with the optical axis 201 but in the opposite direction of that just explained, the resistances of the photo-cells 179 and 181 will be reversely changed resulting in the signal pulses impressed in wire 190 still being alternately large and small in magnitude but in reverse order. That is to say the high pulses of the previous example will now be the low pulses and vice versa. When this type of signal is de-modulated by the de-modulator 167, there will result a net D.C. component of opposite polarity, which, when amplified and delivered to the motor 116 will cause it to run in the opposite direction. This results in the turning of the shaft 118 in the opposite direction and movement of the sub-carriage 97 with respect to the main carriage 10 in the opposite direction until the error in alignment has been substantially reduced to zero.

In order to prevent the observing unit 112 from trying to track circumferential lines 17 during the return stroke of the carriage 10 from left to right, the cam 125 is contoured to keep the contacts 126 open during the return stroke. The contacts 126 will be closed to energize the control circuit 122 shortly after the carriage 10 has been brought up to a constant speed during its right to left stroke. The contacts will remain closed during the tracking portion of the stroke of the carriage 10 until the cutters are brought into contact with the tube, after which they will be opened for the return stroke.

During normal operation of the machine 9 it will be appreciated that many corrections will be made over a period of time. If the sum of the corrections in one direction and the sum of the corrections in the opposite directions are equal, then the sub-carriage 97 will remain substantially centered with respect to the main carriage 10. This situation rarely, if ever, occurs, it being most usual for corrections in one direction to occur more frequently than corrections in the other direction. This results in the sub-carriage 97 being gradually shifted in one direction with respect to the main carriage 10 such that if the trend is not corrected the sub-carriage will eventually reach the end of its allowable travel space. Since it takes quite some time for such a trend of movement to develop it is possible for the operator of the machine to make periodic corrections to the P.I.V. drive unit 41 in the absence of the automatic control effected by the reversible motor 141 through the differential gear box 148.

However, with my automatic control system in operation the sub-carriage 97 is automatically maintained within a safe travel limit with respect to the carriage 10. If, for instance, the trend of corrections causes the sub-carriage 97 to move to the left, eventually the depending finger 134 will make contact with the left side of the U-shaped end portion of the operating plunger 132 of switch 131 causing appropriate contacts of the switch to be closed to complete a circuit through wires 135 and 136 into the relay circuit 138. The completion of this circuit results in a timed current being delivered to the motor 141 through the wire 142 and back through the wire 143. This will cause the output shaft 145 of the motor 141 to rotate counter-clockwise a few revolutions which results in a proportional counter-clockwise motion of the adjusting shaft 45 of the P.I.V. drive unit 41 which causes the P.I.V. output shaft 44 to be speeded up with the net result being that the back and forth motion of the carriage 10 will be speeded up slightly. The time length of the current delivered to the motor 141 is priorly set to be of such duration that the adjustment to the P.I.V. unit 41 will be great enough to cause a trend of movement of the sub-carriage 97 in a reverse direction. The sub-carriage 97 will now begin moving to the right and the finger 134 will move across the opening of the U-shaped end of the plunger 132 until eventually it will contact the right side of the U. When this occurs a circuit will be created through appropriate contacts of the switch 131, wires 136 and 137 and into the relay circuit 138. This results in a timed current being applied to the reversible motor 141 through the wire 144 and returned through the wire 143. This will cause the rotation of the shaft 45 a few revolutions in a clockwise direction causing the main carriage 10 to be slightly slowed down. This causes the sub-carriage 97 again to begin moving to the left to repeat the cycle.

Referring to FIG. 5 it will be seen that when the cutter 13 is in alignment with a circumferential ring or line 17 the cutters 11 and 12 and 14 and 15 are displaced by a small amount toward the cutter 13 with respect to the position of the line 17 nearest the respective cutters. The reason for this is that what is known as "parcelled out planned trim" has been equally distributed among the patterns 20 that have been wound. It has been found in practice that such parcelled out planned trim is necessary in order to insure that all of the containers manufactured will be of the required length. When the cutters of FIG. 5 are brought up against the tube 16 in cutting relationship the cuts will be made along the dotted lines 206 adjacent the line 17 with the exception of the cut made by the cuttter 13 which will be on the adjacent line 17. When using parcelled out planned trim the end cutter 11 will always remove a waste ring of material the width of which is defined by the priorly cut end 207 and the dotted line 206 adjacent the cutter 11. The resulting ring is indicated at 209. With this practice the patterns 20 are not exactly centered with respect to the cut lines 206 which form the container ends but the amount of off-center is slight and noticeable only under careful scrutiny when the patterns or labels have been properly designed to minimize the visible effects of this inaccuracy. Also, after cutting takes place, some of the containers having ends defined by the lines 206 will contain a line 17 near one end thereof. This line normally will not be visible when the container is completed by the application of metal ends thereto by the double seaming process as the line will be hidden within the seam. It is also feasible, in order to avoid any possible undesired visibility of line 17 on the finished container, to only print on the strip 18 one line 17 which will be adjacent the cutter 13 for each length of the tube 16 that will be cut during each operation of the array of cutters.

The width of the waste ring 209 to be cut during each operation of the array of cutters is a function of the maximum expected winding and cutting errors that will normally occur during a manufacturing operation. By using the presently disclosed invention errors in cutting are substantially eliminated. Because of this substantial elimination of cutting errors the necessary excess material usually provided in the planned trim parcelled out among the patterns will either not be necessary; or, if necessary, will be of a very small magnitude. It is thus apparent that the waste ring 209 cut during each operation of the gang cutters will, on the average, be of shorter width than has heretofore been possible. Although the amount of material saved per cut is insignificant the total amount of material saved yearly when manufacturing millions and even billions of containers become economically significant to the extent that worthwhile savings are achieved.

When using a single cutter on a spiral container winding machine constructed in accordance with the present invention, as illustrated in FIG. 6, a like saving in material is achieved; because, due to the greater accuracy of cutting, the width of the trim space 205 can be made smaller.

For a better understanding of the necessity of the use of planned trim, either parcelled out among the patterns as shown in FIG. 5; or, as periodically spaced between patterns as shown in FIG. 6, reference is herein made to U.S. patents to Ernest B. Robinson reissue No. 23,899 and No. 2,737,091 in which the subject is thoroughly discussed.

Although only a preferred embodiment of the invention has been illustrated and described herein, it is to be understood that obvious modifications will become apparent to one skilled in the art. For instance it will be understood that the circumferential line 17 need not be optically visible as described above and its position relative to a reference point need not be observed by the photo-electric means described. Line 17 can be more broadly defined as any quantitatively detectable linear discontinuity previously applied or imposed on the label material in a fixed dimensional relationship thereto in such a way as to be disposed circumferentially on the tube after winding. Similarly the definition of the observing means 112 can be broadly interpreted as any means capable of providing a continuous signal which can be quantitatively correlated to the nearness and directional disposition of the above described discontinuity with respect to a point fixed in relation to the observing means. Some examples falling within the above broad definitions would be:

(1) A line composed of magnetic material combined with a spaced pair of magnetic proximity detectors.

(2) A "gray scaled" or half-toned line of magnetic material combined with a single magnetic proximity detector.

(3) A chemical line photoelectrically detectable only under ultra-violet, infra-red, or X-ray excitation.

(4) A line of material applied to the opposite side of the label foil laminate and detectable by ultrasonic echo matching.

(5) A physical discontinuity in the label foil such as a removed or added strip, a raised line or a depressed line combined with a pair of spaced and null-balanced eddy-current proximity detectors.

Many other combinations of discontinuities with appropriate detecting means falling within the above broad definitions would be within the scope of the invention.

Similarly the means described for moving the sub-carriage 97 should be considered as illustrative and not restrictive. Any appropriate linear transducer could be used in place of the motor 116 and its associated screw 118. In certain circumstances where faster response would be desirable the described linear motion means could be replaced by a hydraulic cylinder and a suitable electro-hydraulic servo valve without changing the intent or function of the motion system.

Also, the number of cutters used in the cutter array may be greater or lesser than illustrated, depending on the size of the machine, length of the containers desired, production rate, and other factors.

The scope of my invention is therefore not intended to be limited to the apparatus shown but rather as set forth in the following claims.

I claim:

1. In a machine for the production of spirally wound tubes from strip material including: means for winding strip material spirally on a mandrel to form a tube having periodically recurring circumferential registration lines thereon, and for moving the tube axially along the mandrel; cutting means positioned adjacent the being formed tube for severing lengths from the tube as it is produced; and means for moving the cutting means cyclically back and forth parallel to the axis of the mandrel; the improvement comprising: observing means mounted for movement with the cutting means for observing a registration line during a portion of the cyclical movement of the cutting means in which the tube and cutting means are moving in the same direction and at substantially the same speed; adjusting means independent of the means for cyclically moving the cutting means being able to continuously adjust the position of the observing means and cutting means with respect to the being wound tube during the said portion of the cyclical movement of the cutting means; and control means continuously responsive to a deviation of the registration line being observed from a desired position with respect to the observing means, said control means being operatively associated with the adjusting means so as to continuously cause to be minimized any such said deviation that may be present prior to the severing of the tube.

2. In a machine for the production of spirally wound tubes from strip material including: means for winding strip material spirally on a mandrel to form a tube having periodically recurring circumferential registration lines thereon, and for moving the tube axially along the mandrel; cutting means positioned adjacent the being formed tube for severing lengths from the tube as it is produced; a main carriage for supporting the cutting means; and means for moving the main carriage and cutting means cyclically back and forth parallel to the axis of the mandrel; the improvement comprising: a sub-carriage mounted for back and forth adjustable movement on the main carriage parallel to the axis of the mandrel and having said cutting means mounted thereon for adjustable movement therewith; observing means mounted on the sub-carriage for movement with the cutting means and for observing a circumferential registration line during a portion of the cyclical movement of the cutting means in which the tube and cutting means are moving in the same direction and at substantially the same speed; adjusting means for adjusting the position of the sub-carriage with respect to the main carriage; and control means continuously responsive to a deviation of the registration line being observed from a desired position with respect to the observing means, said control means being operatively associated with the adjusting means so as to continuously cause to be minimized any such said deviation that may be present prior to the severing of the tube.

3. Claim 2 in which the said control means is associated with a timing means which causes the control means to be operative only during the said portion of the cyclical movement of the cutting means in which the tube and cutting means are moving in the same direction and at substantially the same speed.

4. Claim 3 in which the adjusting means includes a reversible motor mounted for movement with the main carriage, and operation of which in one direction causes the sub-carriage to be moved with respect to the main carriage in the direction of advance of the being wound tube, and, when operated in the opposite direction, causes the sub-carriage to be moved with respect to the main carriage opposite the direction of advance of the being wound tube.

5. Claim 2 in which the amount of back and forth adjustable movement of the sub-carriage is limited in both directions and means are provided for automatically adjusting the cyclical speed of the main carriage, whenever; due to a trend of deviation of successively observed registration lines in one direction, the sub-carriage, due to responsive corrective movement in the same direction, approaches a limit; the adjustment being great enough to reverse the direction of the trend of deviation of the observed registration lines and sub-carriage.

6. In a machine for the production of spirally wound tubes from strip material including: means for winding strip material spirally on a mandrel to form a tube having periodically recurring normally visible circumferential registration lines on the outer surface thereof, and for moving the tube axially along the mandrel; cutting means positioned adjacent the being formed tube for severing lengths from the tube as it is produced; and means for moving the cutting means cyclically back and forth parallel to the axis of the mandrel; the improvement comprising: observing means of the photo-electric type mounted for movement with the cutting means for observing a normally visible registration line during a portion of the cyclical movement of the cutting means in which the tube and cutting means are moving in the same direction and at substantially the same speed; adjusting means independent of the means for cyclically moving the cutting means being able to continuously adjust the position of the photo-electric type observing means and cutting means with respect to the being wound tube during the said portion of the cyclical movement of the cutting means; and control means continuously responsive to a deviation of the registration line being observed from a desired position with respect to the observing means, said control means being operatively associated with the adjusting means so as to continuously cause to be minimized any such deviation that may be present prior to the severing of the tube.

7. In a machine for the production of spirally wound tubes from strip material including: means for winding strip material spirally on a mandrel to form a tube having periodically recurring circumferential registration lines thereon, and for moving the tube axially along the mandrel; cutting means positioned adjacent the being formed tube for severing lengths from the tube as it is produced; and means for moving the cutting means cyclically back and forth parallel to the axis of the mandrel; the improvement comprising: observing means mounted for movement with the cutting means for observing a registration line during a portion of the cyclical movement of the cutting means in which the tube and cutting means are moving in the same direction and at substantially the same speed; adjusting means being able to continuously adjust the position of the observing means and cutting means with respect to the being wound tube during the said portion of the cyclical movement of the cutting means; and control means continuously responsive to a deviation of the registration line being observed from a desired position with respect to the observing means, said control means being operatively associated with the adjusting means so as to continuously cause to be minimized any such said deviation that may be present prior to the severing of the tube.

8. In a machine for the production of spirally wound tubes from strip material including: means for winding strip material spirally on a mandrel to form a tube having periodically recurring circumferential registration lines thereon, and for moving the tube axially along the mandrel; cutting means positioned adjacent the being formed tube for severing lengths from the tube as it is produced; a main carriage for supporting the cutting means; and means for moving the main carriage and cutting means cyclically back and forth parallel to the axis of the mandrel; the improvement comprising: a sub-carriage mounted for limited back and forth adjustable movement on the main carriage parallel to the axis of the mandrel and having said cutting means mounted thereon for adjustable movement therewith; observing means mounted on the sub-carriage for movement with the cutting means for continuously observing and tracking a circumferential registration line during a portion of the cyclical movement of the cutting means in which the tube and cutting means are moving in the same direction and at substantially the same speed, said observing means being of a type capable of developing an appropriate continuous error signal in response to any deviation of the registration line being observed from a central position with respect to the observing means; adjusting means for adjusting the position of the sub-carriage with respect to the main carriage including a reversible electric motor fixedly mounted on the main carriage for movement therewith, said reversible electric motor having a rotatable output shaft which is connected in driving relationship with a threaded shaft which is received in a threaded bore in a main body of the sub-carriage, the operation of the reversible electric motor output shaft in one direction causing the threaded shaft to be turned in a like direction resulting in the movement of the sub-carriage with respect to the main carriage in the direction of advance of the being wound tube, and, when the reversible electric motor output shaft is operated in the opposite direction the sub-carriage is caused to be moved with respect to the main carriage opposite the direction of advance of the being wound tube; control means associated with the observing means and being continuously responsive to error signals received from the observing means due to a deviation of the registration line being observed and tracked from the desired central position with respect to the observing means, said control means being operatively associated with the said reversible electric motor so as to continuously cause to be minimized any such said deviation that may be present prior to the severing of the tube; said control means also being associated with a timing means which causes the said control means to be operative only during the said portion of the cyclical movement of the cutting means in which the tube and cutting means are moving in the same direction and at substantially the same speed; means for automatically adjusting the cyclical speed of the main carriage, whenever; due to a trend of deviation of successively observed registration lines in one direction, the sub-carriage, due to responsive corrective movement in the same direction, approaches a limit; the adjustment being great enough to reverse the direction of the trend of deviation of the observed registration lines and sub-carriage, said means for automatically adjusting the cyclical speed of the main carriage including; a single pole double throw switch fixedly mounted to the main carriage for movement therewith, said single pole double throw switch having an operative element for positioning the switch in one of its two circuit completing positions; said operating element being operatively associated with the sub-carriage for operation by movement of the sub-carriage; a reversing relay and adjustable time delay relay circuit in electrical communication with the said single pole double throw switch; a reversible electric motor electrically connected into the reversing relay and adjustable time delay relay circuit for controlled direction and time operation thereby; and speed control means associated with the means for moving the main carriage and cutting means cyclically back and forth, said speed control means having a speed adjustment control element operated by said reversible electric motor electrically connected into the reversing relay and adjustable time delay relay circuit.

References Cited by the Examiner

UNITED STATES PATENTS

| | | | |
|---|---|---|---|
| 2,623,443 | 12/1952 | Robinson | 93—80 |
| 2,623,445 | 12/1952 | Robinson | 93—80 |
| 2,699,099 | 1/1955 | Robinson | 93—80 |
| 2,734,432 | 2/1956 | Robinson et al. | 93—80 |
| 3,150,574 | 9/1964 | Glasby | 93—80 |

FOREIGN PATENTS

| | | |
|---|---|---|
| 868,053 | 5/1961 | Great Britain. |

FRANK E. BAILEY, *Primary Examiner.*

FRANK H. BRONAUGH, *Examiner.*